Nov. 15, 1955  A. MAIER  2,723,739
CAM ENGAGED FRICTION CLUTCHES
Filed July 10, 1951
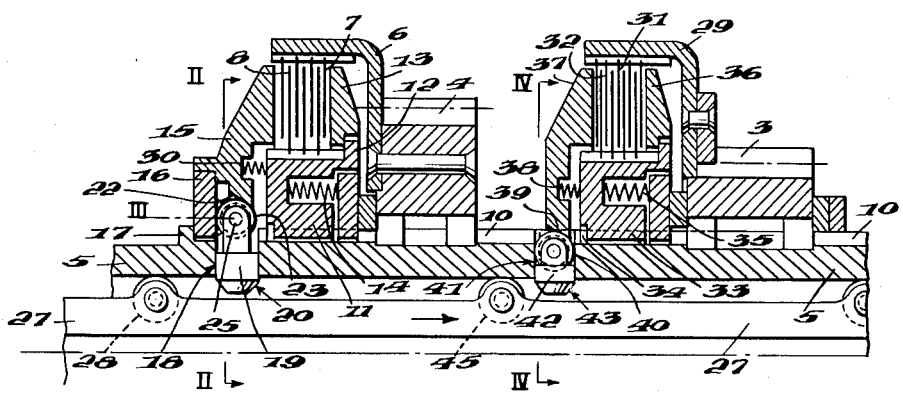
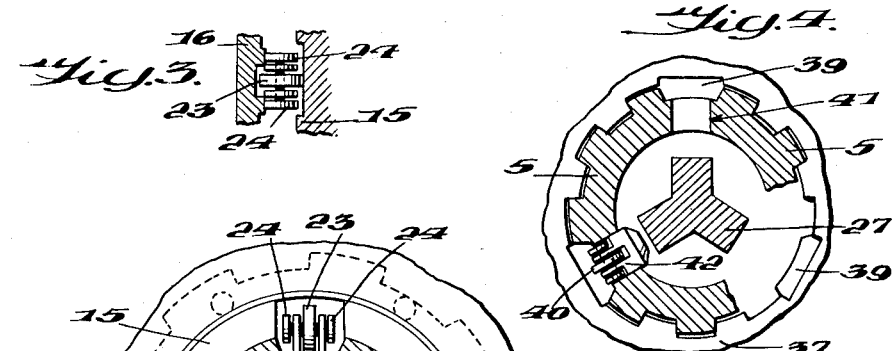
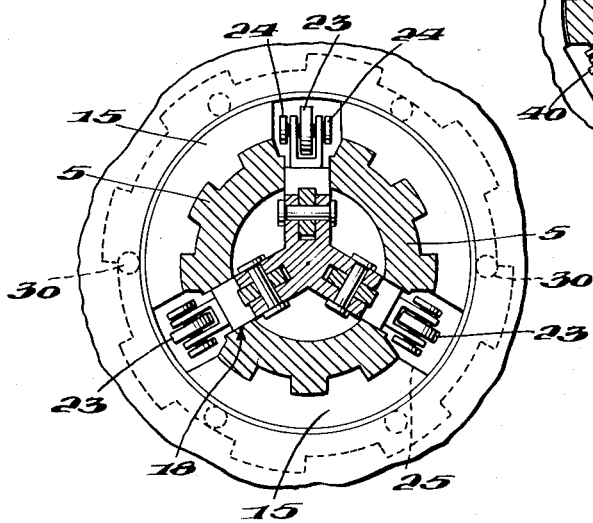
INVENTOR
ALBERT MAIER,
BY Parry and Siese
ATTORNEYS United States Patent Office 2,723,739
Patented Nov. 15, 1955

2,723,739

CAM ENGAGED FRICTION CLUTCHES

Albert Maier, Friedrichshafen, Boden See, Germany, assignor to Zahnradfabrik Friedrichshafen, Aktiengesellschaft, Friedrichshafen, Boden See, Germany Application July 10, 1951, Serial No. 235,975

Claims priority, application Germany July 27, 1950

4 Claims. (Cl. 192—93)

My invention relates to friction clutches of the type comprising an outer coupling part and an inner coupling part, a plurality of outer and inner friction discs, respectively, an axially undisplaceable coupling plate belonging to the inner part of the clutch, a slidable end disc adapted to be pressed against that plurality of friction discs and against said undisplaceable coupling plate.

It has hitherto been customary in clutches of this kind to press the slidable end disc of the clutch against the friction plates either by means of lever arrangements bearing directly against the end disc, or by a sliding sleeve operated by a control lever. Both types of engaging means however require too much space, that is to say the entire clutch becomes too large either in diameter or in the axial direction, with the consequential disadvantage that such clutches are less suitable for use in change-speed gears, where the maximum economy of space is important.

My present invention aims at obviating this disadvantage, and to this end consists in an arrangement wherein transmission members are provided which are adapted to slide radially for the purpose of pressing the slidable end disc against the bundle of plates and to compress the latter, and which are acted on from the interior of the coupling shaft and act directly on the end disc. The transmission members may be of any desired type, and similarly the means of operating the transmission members, which are accommodated inside the coupling shaft may be of any desired kind.

The transmission members are preferably each composed of a plunger and a rolling body while the operating means in the coupling shaft are also preferably provided with rolling bodies, so that as far as possible rolling friction is used. The displacement members are advantageously guided for radial movement in the walls of the coupling shaft. Inclined surfaces on the parts to be coupled cooperate with the rolling bodies. The slidable end disc of the disc clutch may have an inclined surface at a plurality of points on its internal diameter, or may also form a conical annular surface over which the balls or rollers are adapted to roll when the end disc is pressed against the plates. It is here of particular advantage that the path is short and for the expenditure of force required to engage the clutch is correspondingly lower as the result of the use of rolling friction. Engagement also takes place completely without shock.

The construction of plate clutches according to the invention is of particular advantage in changespeed gears for motor vehicles, where the individual clutches have to be disposed on the gear shaft as closely as possible one behind the other in combination with the gear wheels. By this means a considerable reduction of the overall length of the gearbox is obtained.

It is true that it is known to control changespeed plate clutches in machine tools with the aid of a connecting rod guided in the gear shaft, but this construction requires a control sleeve between the change speed couplings and also outside, so that the whole coupling system again is of great length. The known construction is not suitable for series arrangement of a plurality of disc clutches.

In order that my invention may be more readily understood, reference is made to the accompanying drawings, which illustrate diagrammatically and by way of example, two embodiments thereof, and in which—

Figure 1 shows two plate clutches constructed in accordance with the invention, partly in longitudinal section, aligned one behind the other on a gear shaft. These two clutches are of slightly different shape from one another;

Figure 2 is a cross-section along the line II—II of the clutch illustrated on the left of Figure 1;

Figure 3 is a horizontal section taken along the line III—III of the clutch shown on the left of Figure 1; and Figure 4 is a cross-section along the line IV—IV of the clutch shown on the right of Figure 1.

The clutches are connected respectively to gear wheels 3 and 4, which are freely rotatably mounted but axially fixed on gear shaft 5. To the gear wheel 4 is connected a clutch bell 6 serving to guide a bundle of outer clutch discs 7. A bundle of inner plates 8 are carried by an inner body 11 which is secured, by means of keys 10, so as to co-rotate on the shaft 5. The inner body 11, which is slightly displaceable longitudinally on the shaft 5, forms with its collar 12 a counter-support for a coupling disc 13, against which the bundles of plates 7 and 8 bear. The inner body 11 is supported against the wheel 4 by means of springs 14. An axially slidable end disc 15, which serves to compress the bundles of plates 7 and 8, is guided on the shaft 5 and on a disc 16 which is mounted fast on the shaft 5 to rotate therewith. A collar 17 on the shaft 5 serves as a stop for the disc 16.

Plungers 19 are slidably guided in radial bores 18 in the shaft 5. The shaft 5 is hollow, and the plungers 19 project into its interior with inclined surfaces 20. The outer part of each plunger 19 carries a roller 23, each of which comes into contact with a radially directed sloping surface 22 on the end disc 15. In addition to the roller 23, rollers 24 are also provided, which bear against the stop disc 16 and serve to support the roller 23. The rollers 23 and 24 are mounted on bolts 25. A stem 27 carrying rollers 28 is guided in the longitudinal bore of the gear shaft 5. When the stem is moved in the direction of the arrow shown in Figure 1, the rollers 28 pass onto the inclined surfaces 20 of the plungers 19, and the latter slide outwards, whereupon, through the medium of the rollers 23 and the inclined surfaces 22, the end disc 15 is pressed against the bundle of plates 7, 8 and compresses the latter. When the clutch is disengaged, the end disc 15 is held by springs 30 in its outermost position of rest.

The clutch for the gearwheel 3 is of similar construction to the clutch first described. A clutch bell 29 is secured on the gearwheel 3, and in it are guided outer clutch plates 31. The inner plates 32 are mounted on an inner body 33, which is mounted on the shaft 5 to be co-rotatable therewith but axially slidable over a small path. This path is limited on the one hand by the gearwheel 3 and on the other hand by a collar or retaining ring 34. The springs 35 support the inner body 33 in relation to the gearwheel 3. The inner body 33 has a collar which serves as stop for the clutch disc 36. A slidable end disc 37 for compressing the bundle of plates 31, 32 is guided in the keyways 10 in the shaft 5 and is supported by springs 38 against the inner body 33. The springs hold the end disc 37 in its position of rest.

The end disc has radially directed inclined surfaces 39, against which bear rollers 40 on plungers 42 which are guided in radial bores 41 in the shaft 5. These plungers are provided with inclined surfaces 43 at their ends projecting into the interior of the hollow shaft 5. Rollers 45 on the stem 27, which is slidable inside the shaft 5, operatively engage the inclined surfaces 43. When the stem 27 is displaced in the direction of the arrow shown in Figure 1, the rollers 45 engage the inclined surfaces 43 to lift the plungers 42 and rollers 40, which latter through the intermediary of the inclined surfaces 39 cause the end disc 37 to press against the bundle of plates and thereupon to compress the latter.

Any suitable means may be provided for controlling the movement of the stem 27 through which the operation of the radially movable transmission members 19, 42 is effected. Such means may comprise a pivoted fork member cooperating with a peripherally grooved collar carried by the stem 27 at an end thereof.

What I claim is:

1. A friction clutch comprising an outer coupling part, an inner coupling part keyed to a hollow shaft, a plurality of friction discs alternately keyed to said outer and inner coupling parts, a coupling part mounted on said inner coupling part axially fixed relative to said friction discs and presenting a surface adjacent one end of said plurality of discs, a slidable coupling plate presenting a surface adjacent the opposite end of said plurality of discs, said slidable coupling plate being formed with a bevelled surface concentrically with said hollow shaft and adjacent thereto, a plurality of radial bores in said hollow shaft, radially slidable plunger members within said bores, said radially slidable plunger members each having a roller rotatably mounted at the outer end thereof and bearing against the bevelled surface on said slidable coupling plate, the opposite ends of said plungers being formed with actuating surfaces extending inwardly of the hollow shaft and beyond the bores, and axially slidable means cooperating with said actuating surfaces to slide the plungers against the slidable coupling plate thereby compressing the friction discs against said fixed coupling plate.

2. A friction clutch comprising an outer coupling part, an inner coupling part keyed to a hollow shaft, a plurality of friction discs alternately keyed to said outer and inner coupling parts, an axially fixed coupling plate attached to said inner coupling part and presenting a surface adjacent one end of said plurality of discs, a slidable coupling plate presenting a surface adjacent the opposite end of said plurality of discs, said slidable coupling plate being formed with a bevelled surface concentrically with said hollow shaft and adjacent thereto, a plurality of radial bores in said hollow shaft, radially slidable plunger members within said bores, said radially slidable plunger members each having a roller rotatably mounted at the outer end thereof and bearing against the bevelled surface on said slidable coupling plate, the opposite ends of said plungers each being formed with a bevelled actuating surface extending inwardly of the hollow shaft and beyond the bores, and axially slidable means comprising a longitudinal stem within said hollow shaft having rollers thereon adapted to cooperate with the bevelled actuating surface on each of said plunger members to radially reciprocate the plungers outwardly of the shaft thereby sliding the slidable coupling plate against the friction discs and the fixed coupling plate.

3. In a friction clutch; a hollow shaft carrying a bell-shaped coupling part rotatably mounted thereon, a sleeve keyed to said shaft inside the bell-shaped part, a series of friction discs alternately keyed to the bell-shaped part and the sleeve, an axially fixed plate member adjacent one end of said series of friction discs and attached to the sleeve, an axially slidable coupling plate adjacent the other end of said series of friction discs, said shaft being formed with radial bores aligned with said coupling plate, a radially slidable plunger disposed in each of said bores, the inwardly extending ends of said plungers being formed with bevelled surfaces and the other ends of each of said plungers bearing a roller rotatably mounted thereon, the coupling plate being formed with a bevelled surface adjacent said plunger rollers and a longitudinally slidable stem within said shaft having projections thereon cooperating with the bevelled surface on each of said plungers, whereby axial movement of said stem moves the plungers towards the coupling plate, moving the coupling plate axially of the shaft and compressing the friction discs against the fixed plate member.

4. In a friction clutch; a hollow shaft carrying a bell-shaped coupling part rotatably mounted thereon, a sleeve keyed to said shaft inside the bell-shaped part, a series of friction discs alternately keyed to the bell-shaped part and the sleeve, an axially fixed plate member mounted on said sleeve adjacent one end of said series of friction discs, an axially slidable coupling plate adjacent the other end of said series of friction discs, said shaft being formed with radial bores aligned with said coupling plate, a radially slidable plunger disposed in each of said bores, the inwardly extending ends of said plungers being formed with bevelled surfaces and the other ends of each of said plungers bearing a roller rotatably mounted thereon, the coupling plate being formed with a bevelled surface adjacent said plunger rollers and a longitudinally slidable stem within said shaft having projections thereon cooperating with the bevelled surface on each of said plungers, whereby axial movement of said stem moves the plungers towards the coupling plate, moving the coupling plate axially of the shaft and compressing the friction discs, said hollow shaft being formed with a plunger guiding part in the bores and additional rollers on said plungers coaxial with the first rollers and bearing on said guiding part.

References Cited in the file of this patent

UNITED STATES PATENTS

| Number | Name | Date |
|---|---|---|
| 890,211 | Bullard | June 9, 1908 |
| 1,443,445 | Tolles | Jan. 20, 1923 |
| 1,623,236 | De Roo | Apr. 5, 1927 |
| 1,951,724 | Bush | Mar. 20, 1934 |
| 2,196,475 | Reed | Apr. 9, 1940 |
| 2,244,169 | Miller | June 3, 1941 |
| 2,405,642 | Corte | Aug. 13, 1946 |
| 2,496,201 | Dodge | Jan. 31, 1950 |
| 2,600,520 | Spase | June 17, 1952 |

FOREIGN PATENTS

| Number | Country | Date |
|---|---|---|
| 241,259 | Switzerland | July 1, 1946 |
| 455,222 | Great Britain | Oct. 12, 1936 |
| 645,904 | Great Britain | Nov. 8, 1950 |
| 719,460 | Germany | Mar. 12, 1942 |